United States Patent [19]

Lat et al.

[11] 4,386,180

[45] May 31, 1983

[54] WATER-BASED STAIN

[75] Inventors: Geronimo E. Lat, Skokie; Thomas F. Sheppard, Wheeling, both of Ill.

[73] Assignee: United States Gypsum Company, Chicago, Ill.

[21] Appl. No.: 338,772

[22] Filed: Jan. 11, 1982

[51] Int. Cl.³ ............... C09D 3/26; C09D 3/42; C09D 3/80; C09D 15/00
[52] U.S. Cl. ............... 524/272; 106/7; 106/11; 106/34; 106/222; 106/227; 106/228; 524/270; 524/313
[58] Field of Search ............... 106/7, 222, 227, 228, 106/34; 524/272, 270, 313

[56] References Cited

U.S. PATENT DOCUMENTS

| | | | |
|---|---|---|---|
| 2,691,564 | 10/1954 | Berglund | 106/228 |
| 3,332,899 | 7/1967 | Cummings et al. | 524/563 |
| 3,547,847 | 12/1970 | Levine et al. | 524/313 |
| 4,018,732 | 4/1977 | Lakshmanan | 524/270 |
| 4,240,939 | 12/1980 | Kostic | 106/7 |

FOREIGN PATENT DOCUMENTS

| | | | |
|---|---|---|---|
| 483243 | 5/1952 | Canada | 524/272 |
| 54-2826 | 1/1979 | Japan | 524/272 |
| 2051089 | 1/1981 | United Kingdom | 524/272 |
| 249517 | 12/1969 | U.S.S.R. | 106/222 |
| 732348 | 5/1980 | U.S.S.R. | 524/272 |

*Primary Examiner*—Ronald W. Griffin
*Attorney, Agent, or Firm*—Robert M. Didrick; Samuel Kurlandsky; Robert H. Robinson

[57] ABSTRACT

A water-based stain having a working time of from about 1 to about 3 minutes and a tack-free drying time of from about 10 to about 15 minutes at 160° F. comprises an acrylic latex, a drying oil, ester gum, a glycol, a hydrocarbonaceous solvent, and pigment.

10 Claims, No Drawings

WATER-BASED STAIN

This invention relates to a quick drying water-based stain. More particularly, it relates to a stain especially adapted for decoration of metal and plastic articles on which a groundcoat has been applied. Still more particularly, it relates to a quick drying stain which, immediately upon drying, has good adhesion to such a groundcoat and presents a hard surface for the application of a clear, water-based top coat.

When such articles are stained and finished on a fast moving production line, it is imperative that the residence time between the staining and top-coating operations be held to the minimum. The stain, after rubbing and wiping, is usually force dryed at an elevated temperature. Most commercially available stains, however, remain soft and tacky after the force drying operation and even though a clear top coat may be applied over a stain in such conditions, handling of thus finished surface at the end of the production line must be tediously avoided so that distortion of the stain pattern does not occur.

Now, a waterbased stain comprising an acrylic latex, a drying oil, a rosin ester and a pigment that has an open time of from about 1 to about 3 minutes and a tack-free drying time of from about 10 to about 15 minutes at about 160° F. (about 70° C.) has been discovered.

It is an object of this invention, therefore, to provide a fast drying water-based stain for the decoration of metal panels on a mass production basis.

It is another object of this invention to provide a stain for a groundcoat.

It is a related object of this invention to provide a latex-based stain for groundcoated panels, said stain drying quickly to form a tightly adhering, hard surface.

It is a further object of this invention to provide a water-based stain having a working time of from about 1 to about 3 minutes.

It is a still further object of this invention to provide a stain which may be applied by hand.

It is yet another object of this invention to provide a stain having good leveling properties.

These objects and others which will become apparent are achieved by the invention as described below.

The binder system for the stain includes the acrylic resin of the latex, the drying oil and the ester gum. The resin content of the latex is usually from about 30% to about 45% by weight. Homopolymers and copolymers of alkyl acrylates and methacrylates and copolymers of such monomers with acrylonitrile, styrene and similar vinyl monomers exemplify the resins. The term "alkyl" is used herein to mean an alkyl group having from 1 to 8 carbon atoms. A copolymer of an acrylate or methacrylate with styrene is preferred. Early water resistance is an important characteristic of the resins when the stain is to receive a water-based clear top coat.

Usually, the resin of the latex constitutes from about 4% to about 15% of the total weight of the stain. Preferably, the amount is from about 6% to about 10%.

Any drying oil that dries to a hard film may be used; examples of such include linseed oil, oiticica oil, tung oil and perilla oil. One or more of such drying oils may be used in an amount totaling from about 1% to about 3%, preferably to about 2%, of the weight of the aqueous stain.

A low-acid ester gum or rosin ester is the third component of the binder. It is used in an amount ranging from about 0.3% to about 1% of the weight of the stain. A preferred amount is from about 0.4% to about 0.6%.

A combination of an alkylene glycol having less than 4 carbon atoms and a hydrocarbonaceous solvent is used to regulate the open or working time of the stain and the tack-free drying time. Propylene glycol is preferred. The total weight of the solvent and the glycol is from about 15% to about 25% of the weight of the stain and the weight ratio of solvent to glycol may range from about 3:1 to about 4:1 but it is preferably from about 3:1 to about 3.5:1. The boiling range of the solvent is preferably rather narrow, e.g., a spread of about 70° to 90° F., but the initial boiling point may be as low as about 250° F. (120° C.) and the dry point may be as high as about 450° F. (about 230° C.). Preferably, the initial point and dry point will lie between about 300° F. and about 400° F. The solvent may be substantially aliphatic or it may be a mixture of aliphatic and naphthenic hydrocarbons. Minor amounts, i.e., less than 10 weight percent and preferably not more than 2 weight percent, may be aromatic hydrocarbons. Petroleum naphtha, VM&P naphtha and the so-called "Rule 66" mineral spirits are examples of the solvent.

The viscosity of the stain may be adjusted by the addition of cellulosic thickeners such as the methylcellulose ethers, e.g., hydroxypropyl methylcellulose. Crosslinked acrylic or methacrylic acid copolymer emulsions also function as thickeners when activated by a base such as ammonium hydroxide or an amine. From about 0.1% to about 3% by weight of the stain is a generally sufficient amount. When an aqueous emulsion of an acidic copolymer is used as the thickener, the copolymer may function to some extent as a binder but it is not taken into account when formulating the binder system for the stain of this invention.

Emulsifiers and dispersants are also useful in formulating the stain. Examples of such include water soluble surfactants such as the alkylphenoxypoly(ethyleneoxy) ethanols and other polyoxyalkylene condensates. Hydroxyalkylamines such as 2-amino-2-methyl-1-propanol are also useful for their dispersing and emulsifying action. Mixtures of two or more emulsifiers and dispersants may be used and the total amount is usually from about 0.3% to about 1% of the stain by weight.

Conventional driers as exemplified by cobalt naphthenate, zirconium octanoate and the like are used in amounts usually ranging from about 0.05% to about 0.1% by weight but more or less may be used.

The pigment is selected, of course, as to both kind and amount in keeping with the desired colors and effect. Ochre, sienna, umber, carbon black, and the iron oxides are among those usually employed in stains.

Water constitutes from about 40% to about 60% of the weight of the stain; this includes water from the acrylic latex and other ingredients and also added water.

The invention is illustrated more specifically by the following example wherein all parts are by weight.

EXAMPLE 1

A mixture of 250 parts of water, 5 parts of an alkylphenoxy poly(ethyleneoxy)ethanol (CTA-639 surfactant sold under the trademark Igepal by General Aniline & Film Corporation), 16.8 parts of bodied linseed oil, and 5.6 parts of ester gum is agitated vigorously to form a smooth emulsion. To the emulsion are added 1 part each of a cobalt drier and a zirconium drier, 45 parts of propylene glycol, 200 parts of an acrylic/styrene latex containing about 64 parts of the resin (latex sold under the trademark Neocryl A-622 by Polyvinyl Chemical Industries), 28 parts of an aqueous emulsion of an acidic copolymer (sold under the trademark Acrysol ASE-60 by Rohm & Haas) as a thickener, 200 parts of water, 3 parts of 2-amino-2-methyl-1-propanol, 1.5 parts of carbon black, 105 parts of burnt umber, and 150 parts of Rule 66 mineral spirits (boiling range=315°–385° F.) with continued agitation. The product is a thin emulsion which has a working time of about 1 to 2 minutes when rubbed onto a surface and wiped to obtain a decorative effect. The stain is dry to the touch in about 6 to 7 minutes and is tack free about 10 minutes at 160° F.

To those skilled in the art to which this invention relates, many changes in composition which do not depart from the spirit and scope of this invention may suggest themselves. The foregoing description is purely illustrative and not restrictive of that spirit and scope.

What is claimed is:

1. An aqueous stain comprising an acrylic latex, a drying oil, a rosin ester, a pigment, and a hydrocarbonaceous solvent, said stain further characterized by an open time of from about 1 to about 3 minutes and a tack-free drying time of from about 10 to about 15 minutes at about 160° F.

2. The stain of claim 1 further comprising an alkylene glycol having less than 4 carbon atoms.

3. The stain of claim 2 wherein the weight ratio of the solvent to glycol is from about 3:1 to about 4:1.

4. The stain of claim 2 wherein the total weight of glycol and solvent is from about 15% to about 25% of its weight.

5. The stain of claim 1 or claim 3 wherein the acrylic resin of the latex constitutes from about 4% to about 15% of the weight of the stain.

6. The stain of claim 5 wherein the drying oil constitutes from about 1% to about 3% of its weight.

7. The stain of claim 6 wherein the rosin ester constitutes from about 0.3% to about 1% of its weight.

8. The stain of claim 7 wherein water constitutes from about 40% to about 60% of its weight.

9. The stain of claim 1 wherein the weight ratio of the acrylic resin of the latex to the rosin ester is from about 4:1 to about 50:1.

10. The stain of claim 1 wherein the weight ratio of the acrylic resin of the latex to the rosin ester is from about 10:1 to about 25:1.

* * * * *